US007121577B2

(12) United States Patent
Schenck et al.

(10) Patent No.: US 7,121,577 B2
(45) Date of Patent: Oct. 17, 2006

(54) COVER FOR AIRBAG MODULE AND METHOD OF MAKING

(75) Inventors: David P. Schenck, Miamisburg, OH (US); Ryan T. Pinsenschaum, Vandalia, OH (US); Mark T. Winters, Troy, OH (US)

(73) Assignee: Delphi Technologies, Inc., Troy, MI (US)

( * ) Notice: Subject to any disclaimer, the term of this patent is extended or adjusted under 35 U.S.C. 154(b) by 95 days.

(21) Appl. No.: 10/391,817

(22) Filed: Mar. 19, 2003

(65) Prior Publication Data

US 2003/0234521 A1   Dec. 25, 2003

Related U.S. Application Data

(60) Provisional application No. 60/390,906, filed on Jun. 24, 2002, provisional application No. 60/391,005, filed on Jun. 24, 2002.

(51) Int. Cl.
*B60R 21/205* (2006.01)
*B60R 21/215* (2006.01)

(52) U.S. Cl. .................................. 280/728.3; 280/732
(58) Field of Classification Search ............. 280/728.3, 280/732
See application file for complete search history.

(56) References Cited

U.S. PATENT DOCUMENTS

| 4,925,209 | A | * | 5/1990 | Sakurai ................... 280/728.3 |
| 4,941,678 | A | | 7/1990 | Lauritzen et al. ........... 280/732 |
| 5,031,930 | A | | 7/1991 | Sato ............................ 280/732 |
| 5,060,972 | A | * | 10/1991 | Satoh et al. ................ 280/732 |
| 5,066,037 | A | | 11/1991 | Castrigno et al. ........... 280/732 |
| 5,074,584 | A | | 12/1991 | Jarboe ....................... 280/743 |
| 5,125,683 | A | | 6/1992 | Nakajima .................... 280/731 |
| 5,184,843 | A | | 2/1993 | Berger et al. ............... 280/728 |
| 5,199,239 | A | | 4/1993 | Younger ........................ 52/595 |
| 5,217,254 | A | | 6/1993 | Satoh .......................... 280/732 |
| 5,228,362 | A | | 7/1993 | Chen et al. .................... 74/552 |
| 5,238,264 | A | | 8/1993 | Barnes ........................ 280/732 |
| 5,301,966 | A | | 4/1994 | Sakata ........................ 280/728 |
| 5,303,951 | A | | 4/1994 | Goestenkors et al. ... 280/732 B |

(Continued)

FOREIGN PATENT DOCUMENTS

EP         0447030 B1        10/1995

*Primary Examiner*—Paul N. Dickson
*Assistant Examiner*—Laura B. Rosenberg
(74) *Attorney, Agent, or Firm*—Scott A. McBain (57) ABSTRACT

A door for an airbag module having an inflatable cushion, the airbag module being adapted to be used in a vehicle having an instrument panel with an airbag module opening, the door having an inner surface and an outer surface adapted to match the instrument panel, comprising: a first member depending away from the inner surface of the door, the first member being movably secured to the airbag module and remains secured to the module during deployment of the inflatable cushion; a second member depending away from the inner surface of the door, the second member being received within a flange opening of the airbag module; and a plurality of latch hooks depending away from the inner surface of the door, the plurality of latch hooks being configured to engage an opening in the airbag module, wherein the first member, the second member and the plurality of latch hooks are each configured to allow movement of the door in three separate directions with respect to the airbag module and wherein the second member and the plurality of latch hooks are configured to detach from the door during deployment of the inflatable cushion.

44 Claims, 9 Drawing Sheets

U.S. PATENT DOCUMENTS

| | | | | |
|---|---|---|---|---|
| 5,306,039 | A | 4/1994 | Nakayama | 280/728 A |
| 5,306,040 | A | 4/1994 | Leonelli et al. | 280/728 B |
| 5,316,334 | A | 5/1994 | Skidmore | 280/728 B |
| 5,316,822 | A | 5/1994 | Nishijima et al. | 428/138 |
| 5,335,939 | A * | 8/1994 | Kuriyama et al. | 280/728.3 |
| 5,378,012 | A | 1/1995 | Seiki et al. | 280/728 B |
| 5,435,593 | A | 7/1995 | Hiramitsu et al. | 280/728.2 |
| 5,456,488 | A | 10/1995 | Bauer | 280/728 |
| 5,527,065 | A * | 6/1996 | Saberan et al. | 280/728.3 |
| 5,556,126 | A * | 9/1996 | Lee | 280/728.3 |
| 5,564,732 | A | 10/1996 | Bauer et al. | 280/728.3 |
| 5,588,669 | A | 12/1996 | Leonard et al. | 280/728.3 |
| 5,590,900 | A | 1/1997 | Duran et al. | 280/728.2 |
| 5,624,130 | A | 4/1997 | Ricks | 280/728.2 |
| 5,630,610 | A * | 5/1997 | Murakami et al. | 280/728.2 |
| 5,709,402 | A | 1/1998 | Leonard | 280/728.2 |
| 5,782,481 | A | 7/1998 | Magoteaux | 280/728.2 |
| 5,813,693 | A * | 9/1998 | Gordon et al. | 280/728.3 |
| 5,851,023 | A * | 12/1998 | Nagata et al. | 280/728.3 |
| 5,865,461 | A * | 2/1999 | Totani et al. | 280/728.3 |
| 5,887,891 | A | 3/1999 | Taquchi et al. | 280/728.2 |
| 5,904,367 | A | 5/1999 | Warnez et al. | 280/728.3 |
| 6,010,146 | A * | 1/2000 | Otsuka et al. | 280/728.2 |
| 6,076,851 | A * | 6/2000 | Davis et al. | 280/728.2 |
| 6,152,480 | A * | 11/2000 | Iwanaga | 280/728.3 |
| 6,164,684 | A | 12/2000 | Lehman | 280/728.2 |
| 6,173,987 | B1 * | 1/2001 | Terasawa et al. | 280/728.2 |
| 6,206,408 | B1 * | 3/2001 | Schneider | 280/728.1 |
| 6,247,722 | B1 | 6/2001 | Brodi, Jr. et al. | |
| 6,296,270 | B1 | 10/2001 | Amamori | 280/728.2 |
| 6,382,660 | B1 | 5/2002 | Starner et al. | |
| 6,390,500 | B1 | 5/2002 | Yamada et al. | 280/743.1 |
| 6,394,485 | B1 | 5/2002 | Amamori | 280/728 |
| 6,422,589 | B1 | 7/2002 | Ostermann et al. | |
| 6,435,548 | B1 | 8/2002 | Suzuki et al. | 280/732 |
| 6,457,744 | B1 | 10/2002 | Tonooka | 280/732 |
| 6,464,280 | B1 | 10/2002 | Shibata et al. | 296/70 |
| 6,481,742 | B1 | 11/2002 | Usami et al. | 280/728.2 |
| 6,485,050 | B1 | 11/2002 | Simon et al. | |
| 6,502,851 | B1 * | 1/2003 | Kitagawa | 280/728.2 |
| 6,502,852 | B1 | 1/2003 | Kassman et al. | |
| 6,517,099 | B1 | 2/2003 | Igawa et al. | 280/728.2 |
| 6,533,314 | B1 | 3/2003 | Merrifield et al. | |
| 6,557,886 | B1 * | 5/2003 | Sakaguchi | 280/728.2 |
| 6,601,870 | B1 * | 8/2003 | Suzuki et al. | 280/728.3 |
| 2003/0234521 | A1 | 12/2003 | Schenck et al. | 280/728.3 |

* cited by examiner

COVER FOR AIRBAG MODULE AND METHOD OF MAKING

CROSS REFERENCE TO RELATED APPLICATIONS

This application claims the benefit of U.S. Provisional Patent Application, Ser. No. 60/390,906, entitled: Cover for Airbag Module and Method of Making, filed Jun. 24, 2002, the contents of which are incorporated herein by reference thereto.

This application also claims the benefit of U.S. Provisional Patent Application, Ser. No. 60/391,005, entitled: Cover for Airbag Module and Method of Making, filed Jun. 24, 2002, the contents of which are incorporated herein by reference thereto.

TECHNICAL FIELD

This disclosure relates generally to airbag modules. More specifically, this disclosure relates to a cover arrangement for an airbag module, and more particularly, to an airbag cover to module attachment that provides for relative movement between the cover and the module.

BACKGROUND

Airbag modules or supplemental inflatable restraint systems have become common in modem automobiles. An airbag module typically comprises an inflatable cushion and an inflator within a housing. The module is installed in a desired position within the vehicle, such as the steering wheel, the dashboard, the seat, the A-pillar, and other locations. The inflatable cushion is stored in a folded position within the housing in fluid communication with the inflator. In response to an activation event or occurrence, a sensor or sensing device provides a signal for activating the inflator. The inflator then provides a supply of inflating gas to the cushion deploying it from the housing.

As more and more vehicles are equipped with airbag modules, other vehicle components have been modified to accommodate the use of such systems. For example, most passenger side airbag module systems are disposed within and behind an instrument panel, which extends across the width of a vehicle compartment. During assembly, a conventional instrument panel in a vehicle having a passenger side airbag module system requires a discrete door which covers an opening formed in the instrument panel for the air bag cushion to deploy through upon actuation of the airbag module system. This separate door is designed to open in response to the force of the expanding air bag cushion. In other words as the pressure in the air bag cushion increases, an internal force is generated within the cushion and as the air bag cushion expands with this force, the door selectively separates from a portion of the module and the instrument panel as the air bag cushion deploys while another portion of the door remains secured to the module during deployment.

Typically, the manufacture of an instrument panel involves forming an opening in the instrument panel proximate to the airbag module system. This opening is then covered by a separate deployable door of the airbag module, which is secured to the instrument panel and faces the occupants of the vehicle. Thus, the instrument panel itself is manufactured in view of the shape and size of the door and the door is separately manufactured and installed within the opening in the instrument panel.

One difficulty encountered with passenger side airbag module covers is a poor fit to finish in the vehicle's instrument panel in which the passenger side airbags are installed. For example, uneven airbag cover to instrument panel gaps and non-flush conditions sometimes occur simply because the covers are fixedly mounted or permanently secured to the airbag canister with no adjusting movement therebetween. Therefore, if the module must be moved or adjusted in order to secure it in its desired location within the vehicle the cover fixedly secured thereto also moves. In addition, and if there is no tolerance or play between the cover and the housing of the module movement of the module will cause movement of the cover, which may provide the undesirable gaps or non-flush conditions mentioned above. This is particularly the case if the cover is in a desired position with respect to the instrument panel prior to movement or adjustment of the module in order to secure to the instrument panel or structural beam of the vehicle. The undesirable effects may be further exacerbated if only one end of the module needs to be adjusted to perform the securement step.

SUMMARY

An airbag module door being capable of floating with respect to the housing to which it is secured. A door for an airbag module having an inflatable cushion, the airbag module being adapted to be used in a vehicle having an instrument panel with an airbag module opening, the door having an inner surface and an outer surface adapted to match the instrument panel, comprising: a first member depending away from the inner surface of the door, the first member being movably secured to the airbag module and remains secured to the module during deployment of the inflatable cushion; a second member depending away from the inner surface of the door, the second member being received within a flange opening of the airbag module; and a plurality of latch hooks depending away from the inner surface of the door, the plurality of latch hooks being configured to engage an opening in the airbag module, wherein the first member, the second member and the plurality of latch hooks are each configured to allow movement of the door in three separate directions with respect to the airbag module and wherein the second member and the plurality of latch hooks are configured to detach from the door during deployment of the inflatable cushion.

A method for securing a deployable door to an airbag module, the deployable door being adapted to allow an inflatable cushion to deploy from the airbag module, comprising: inserting a plurality of latch hooks into an opening of the airbag module; positioning a first door flange in a flange opening of the airbag module; positioning a second door flange adjacent to the airbag module; movably securing the second door flange to the airbag module; wherein the first door flange, the second door flange and the plurality of latch hooks are each configured to allow movement of the deployable door in three separate directions with respect to the airbag module; and wherein the second door flange comprises a plurality of openings configured to receive a securement assembly for hingably securing the second door flange to the airbag module.

Another object of the present disclosure is to provide a cover to airbag module attachment that provides for movement of the cover relative to the module in numerous directions.

Another object of the disclosure is to provide a passenger side airbag cover to airbag module attachment in which the cover can be removed and replaced if necessary without replacing the entire airbag module.

The above-described and other features are appreciated and understood by those skilled in the art from the following detailed description, drawings, and appended claims.

DETAILED DESCRIPTION

The present disclosure relates to a passenger airbag door which can "float" relative to the housing, but still remain securely attached during deployment. In an exemplary embodiment a series of holes are molded into the forward edge of the door flange and a fastener assembly secures the same to the housing while still allowing the door to move with respect to the housing. At the other side of the door a series of molded hooks movably secure the door to the housing. The series of molded hooks mate into a slot on the housing. This housing feature is also sized to allow the molded flange of the hooks to move in the x, y and z directions. As with the forward edge attachment the amount of movement can be varied as required.

Referring now to FIGS. 1–6, an airbag module 10 constructed in accordance with the present disclosure is illustrated. Airbag module 10 includes a housing 12, which is configured to receive and house components of airbag module 10 such components are known to one skilled in the art and include but are not limited to the following: an inflator; an inflatable cushion; a retaining ring; and a cover. The inflator is in fluid communication with an inflation opening of the inflatable cushion and the inflator provides a means for inflating the inflatable cushion in the event of a deployment scenario. The retainer ring provides a means for securing the inflatable cushion to housing.

Housing 12 is configured to have a trough or "U" shaped configuration with a pair of opposing sidewalls, a bottom and an opening positioned for allowing the inflatable cushion to deploy therefrom. Of course, and as applications may require, housing 12 can be configured to have various other configurations. In an exemplary embodiment housing 12 is manufactured out of steel by an extrusion or stamping process. Of course, housing 12 can be manufactured out of other materials including but not limited to other types of metals (e.g. aluminum) and/or polymer materials (e.g., plastic) as well as other methods (e.g., injection molding) that will allow for the inclusion of the features which will be described in more detail below.

A deployable cover or door 14 is positioned on top of housing 12 and allows for deployment of an inflatable cushioned therethrough. Deployable cover 14 is formed out of a material that is lightweight and easily molded (e.g., a polymer such as plastic). In addition, it is also desirable to form deployable cover 14 out of the same material as the instrument panel. For example, deployable cover 14 is formed out of a material having similar characteristics (e.g., color, texture, etc.) as the instrument panel. In accordance with an exemplary embodiment, airbag module 10 is secured within a vehicle by attaching housing 12 to a structural member of the vehicle while cover 14 is removably secured to an interior surface 16 of the vehicle. In an exemplary embodiment the interior surface of the vehicle is the instrument panel. In particular, the periphery of an airbag module opening 17 in the instrument panel.

For example, housing 12 is secured to a cross car structural beam through the use of a plurality of securement features depending outwardly from housing 12 and cover 14 is secured to the periphery of an opening in an instrument panel of the vehicle. In order to allow for a flush or continuous placement or mounting of deployable cover 14 within the opening defined in the instrument panel, deployable cover 14 is secured to housing 12 wherein cover 14 is capable of movement within a range of at least three directions or any combination thereof in order to allow flush securement of the same to the instrument panel. In other words, the movement of the cover with respect to the housing allows for adjustment of the housing while the cover is secured in its preferred location with respect to the instrument panel.

For example, housing 12 is secured to a cross car structural beam through the use of a plurality of securement features depending outwardly from housing 12 and cover 14 is secured to the periphery of an opening in an instrument panel of the vehicle as well as being movably secured to the housing.

In order to allow for a flush or continuous placement or mounting of deployable cover 14 within the opening defined in the instrument panel, deployable cover 14 is movably secured to housing 12 then the module is positioned in through the opening in the instrument panel wherein the periphery of the cover is secured to the periphery of the opening in the instrument panel. Since the cover is secured to the module to allow movement therebetween, the housing is capable of movement with respect to the cover to align securement openings, bolts or other types of securement means with the structural features or opening of the instrument panel or other structural member in the vehicle. This allows for manipulation of the housing after securement of the cover to the instrument panel without adversely affecting the cover and the instrument panel relationship.

Figure 1:
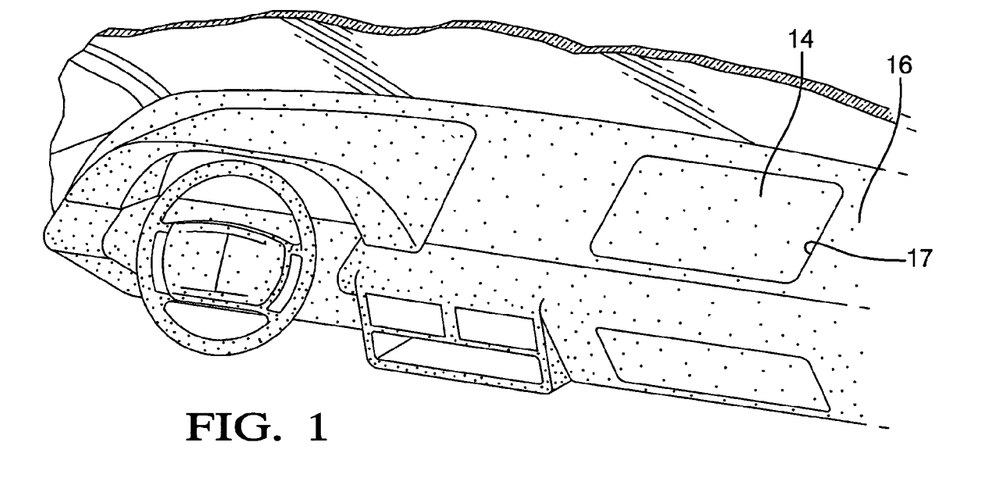
FIG. 1 is a perspective view of a portion of a vehicle interior.
Figure 2:
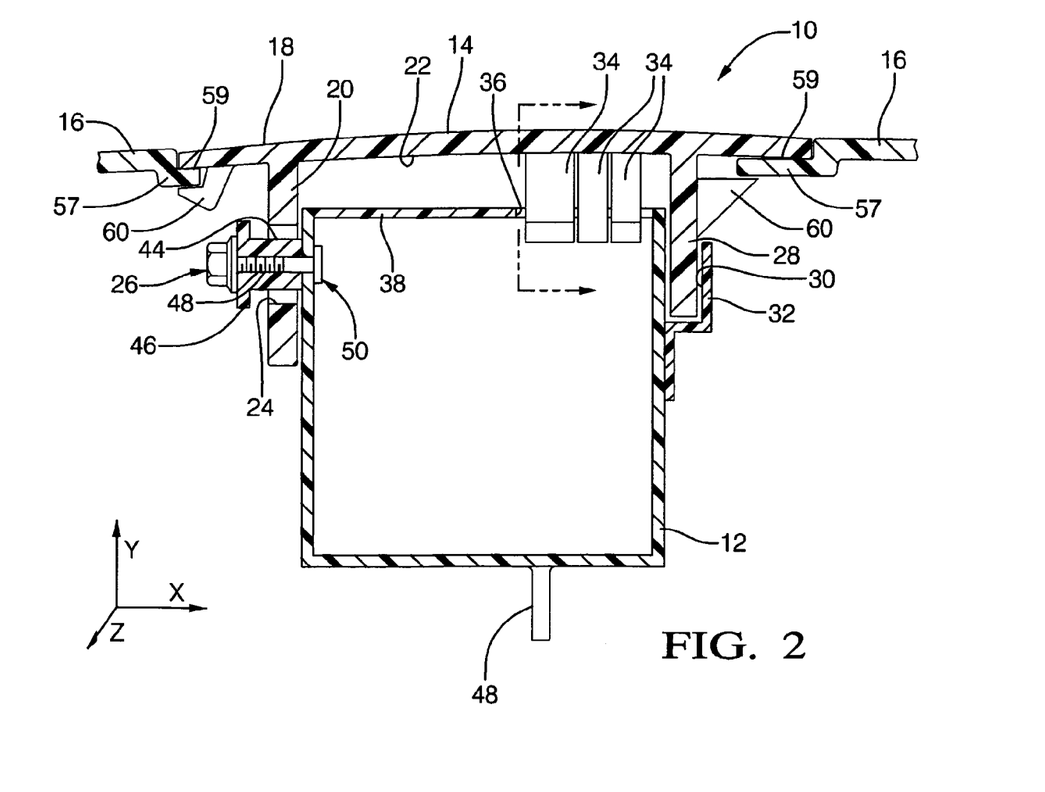
FIG. 2 is a cross sectional view of an airbag module constructed in accordance with the present disclosure.

Referring now to FIG. 2, cover 14 includes an exterior surface 18, which faces toward an occupant of the vehicle as well as forms a portion of the instrument panel surface. Cover 14 also includes a member or forward door flange 20 that depends or extends downwardly from an interior surface 22 of cover 14. Member 20 is located at a forward end of the cover and is positioned to be located at a forward end of the module when the cover is removably secured thereto. The forward end of the module and complementary cover is located closer to a windshield of the vehicle when the module is secured to the instrument panel. It is also noted that the forward end of the cover is the portion of the cover that remains attached to the cover in the event of a deployment scenario wherein the inflatable cushion causes the cover to deploy away from the module. In an exemplary embodiment member 20 is integrally formed with the cover and comprises resilient qualities in order to provide a hinge member for hingably connecting the cover to the housing of the module.

Member 20 comprises a planar member having a rectangular configuration that has a length that runs along the housing in for example a cross car direction. Of course, cover 14 and member 20 may be configured to run along one of the ends of the module (e.g., in a fore and aft direction) as well as having other types of configurations (e.g., other than rectangular).

Member 20 includes an opening 24 or plurality of openings 24 configured to receive a portion of a securement assembly or means 26 (FIGS. 6–14) that secures member 20 to the housing of the module. The configuration of openings 24 and securement assembly 26 allows member 20 and thus, cover 14 to move with respect to housing 10.

At another location and in a facing spaced relationship with respect to member 20, cover 14 also includes a member or rearward door flange 28 that also depends downwardly from interior surface 22. Member 28 is configured to be received within an opening 30 defined by a flange 32 secured to housing 12. In an exemplary embodiment and as illustrated in FIG. 2 members 20 and 28 are disposed on opposite sides or sidewalls of housing 12.

In addition, cover 14 also includes a plurality of latch hooks 34. Latch hooks 34 depend downwardly from interior surface 22 and include a hook portion for being received within an opening 36 defined in an upper portion or flange 38 of housing 10. Latch hooks 34 and opening 30 are configured to allow for movement of cover 14 ('X', 'Y' and 'Z' directions illustrated in FIG. 2) with respect to housing 12 once cover 14 is secured to housing 12. Flange 38 also defines a portion or a portion of the periphery of the opening of housing 12 through which the inflatable cushion deploys.

Figures 3, 4, 5:
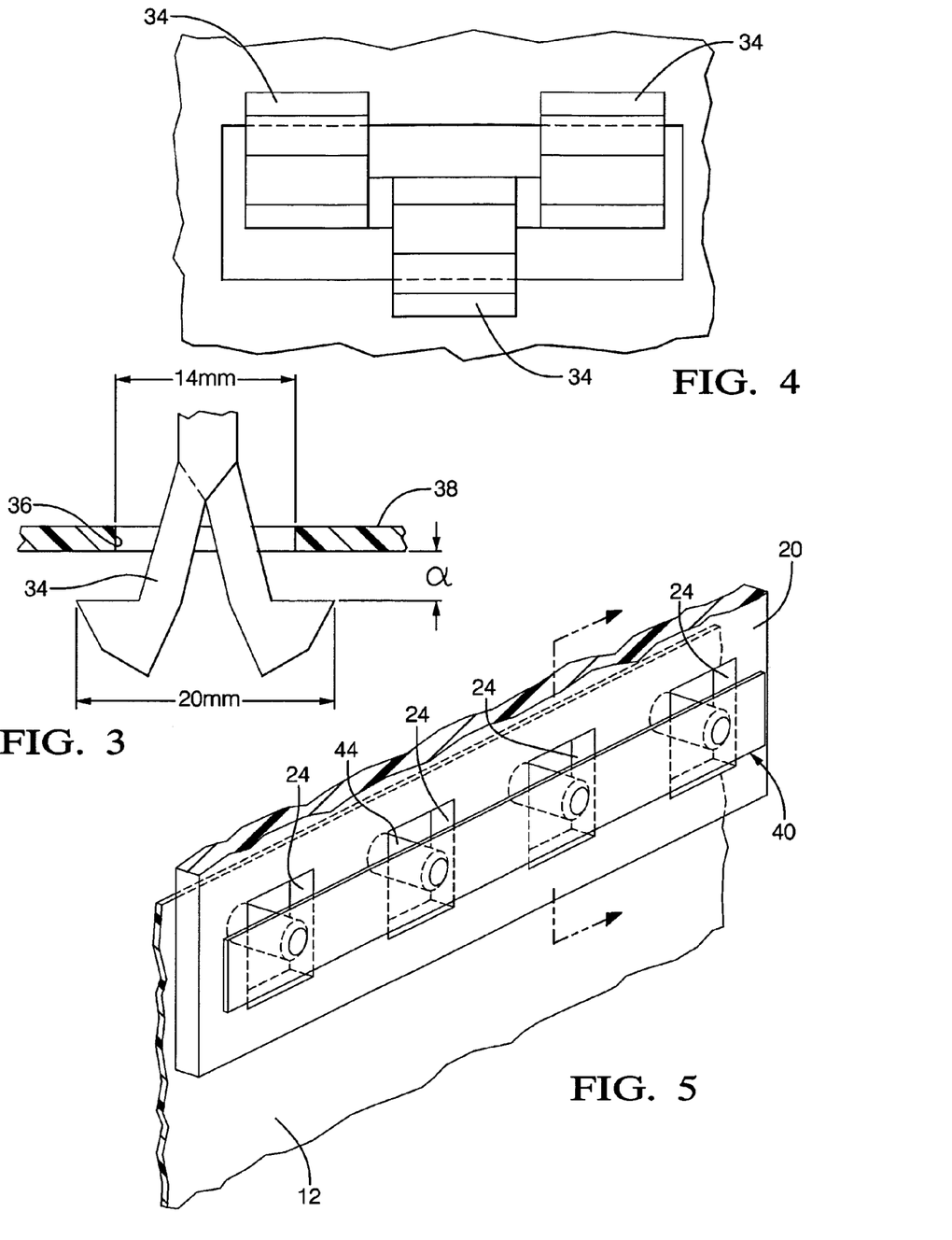
FIG. 3 is a view along lines 3—3 of FIG. 2.
FIG. 4 is a view along lines 4—4 of FIG. 2.
FIG. 5 is a perspective view of a portion of the airbag module illustrated in FIG. 2.

Referring now to FIGS. 3 and 4, latch hooks 34 are illustrated. Each latch hook 34 is formed out of a resilient material such as plastic that is capable of being deformed inwardly as latch hooks 34 are inserted through opening 36. In an exemplary embodiment latch hooks 34 are integrally molded with cover 14. Thus, cover 14 or at least a portion thereof and hooks 34 are formed from the same material. In addition, the latch hooks each include an angled or chamfered surface for engaging the periphery of opening 36 in order to force the latch hooks inwardly as they pass through opening 36. The resilient characteristics of latch hooks 34 will allow the same to spring back to its original position after insertion through opening 36. This original position will prevent latch hooks 34 from passing back through opening 36 as a shoulder portion of the latch hooks will make contact with flange 38. As illustrated in FIG. 4 the latch hooks are positioned in an alternating manner.

Referring now to FIG. 4, latch hooks 34 are configured to provide a tolerance or distance 'α' between the shoulder portion of the latch hook and flange 38. In addition, latch hooks 34 and opening 36 are configured to allow for movement at least in a direction or distance at least equal to those of opening 24 and the opening defined by flange 32. This allows for float or play between deployable cover 14 and module 10.

Referring now to FIGS. 5–14, securement means or assembly 26 is illustrated. In an exemplary embodiment securement assembly 26 comprises a support bracket 40 having a plurality of holes or openings 42 drawn out of the material of bracket 40. Bracket 40 is of a sufficient length to traverse a portion of the sidewall of the housing to movably secure flange 20 thereto. In one embodiment bracket 40 is manufactured out of a metal such as steel in order to provide an item of a sufficient strength for securing a portion of the cover to the housing. Each of the openings 42 have an elongated portion 44 which defines a respective opening 42 and depends away from a bracket surface or plate 46 of bracket 40.

As an alternative, elongated portions 44 are molded, manufactured, stamped, etc. separately and they are then secured to the bracket by a securement method such as welding or equivalents thereof.

Figure 6:
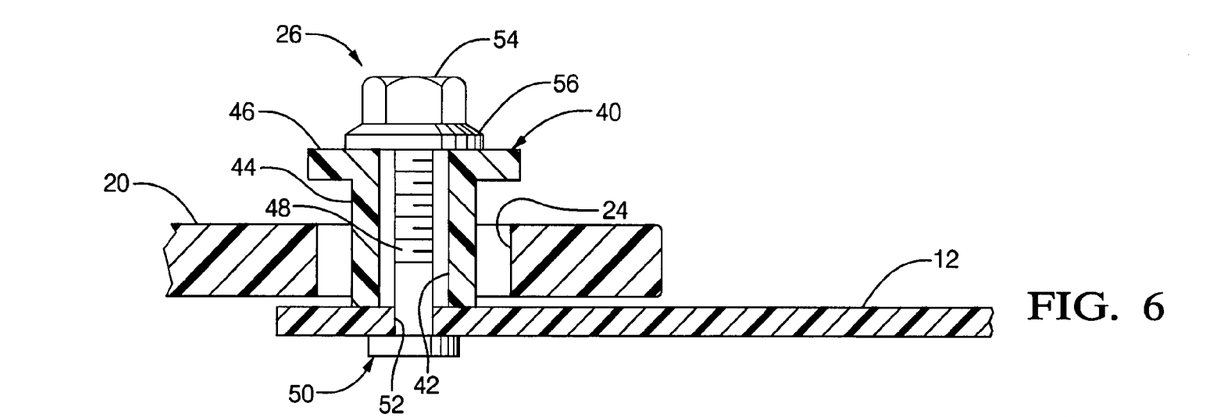
FIG. 6 is a cross sectional view of a portion of the airbag module illustrated in FIG. 2.
Figure 7:
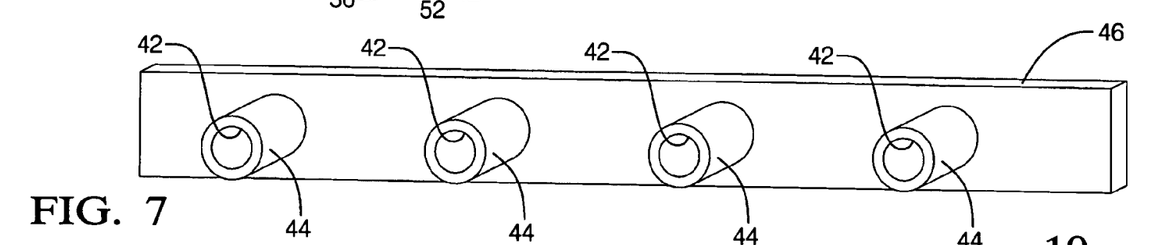
FIG. 7 is a perspective view of a portion of the airbag module illustrated in FIG. 2.
Figure 8:
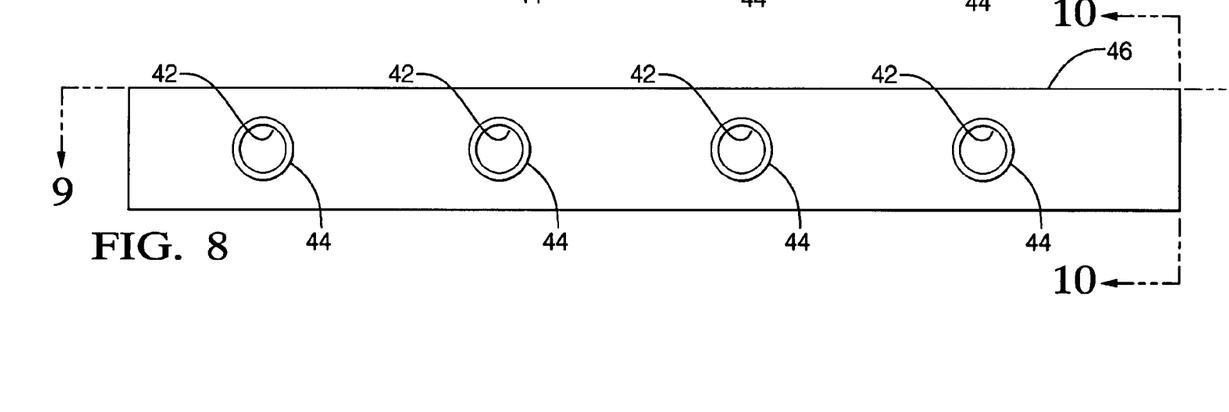
FIG. 8 is a side view of a portion of the airbag module illustrated in FIG. 2.

As illustrated in FIG. 6, the securement of member or door flange 20 to the airbag module housing is illustrated. Here the elongated portions 44 of bracket 40 passes through openings 24 in door flange 20. It is noted that the openings 24 are larger than the outer circumference or diameter of elongated portions 44. Therefore portions 44 are capable of moving within opening 24 thereby allowing for movement of cover 14 with respect to the module. In order to movably secure flange or member 20 to the housing a shaft portion 48 of a stud 50 passes through an opening 52 in the housing wall. In one embodiment, the shaft portion 48 has a threaded portion to threadingly engage a flange nut 54 that threadingly engages the shaft portion of the stud which passes through support bracket 40. In an alternative embodiment stud 50 is integral with housing 14 or the threaded fastener portion of the stud can be integral with housing 12 or be formed as a part of the airbag cushion retainer (not shown). Flange nut 54 has a flange portion 56, which is larger than opening 42 of bracket 40 so that the stud/flange nut connection secures the bracket to the housing and elongated portion 44 passes through opening 24.

As illustrated in FIG. 6, when the stud is secured to the housing and the nut to the stud the distal end of elongated portion 44 makes contact with the housing wall and bracket 40 is secured to the housing in such a manner so that bracket portion 46 is spaced from the housing wall. This leaves an area in which door flange 20 may move about without being disconnected from the module (e.g., movement in X, Y and Z directions). In an exemplary embodiment, 2 mm of movement is available at either side of portion 44 in a horizontal direction and 4 mm is available in a vertical direction when it is centered in opening 24. Therefore a maximum of 4 mm of movement in the horizontal direction and 8 mm of movement in the vertical direction is available. Also, a similar amount of movement is available between the housing wall and the bracket. Of course, these dimensions are provided as examples and are not intended to limit the present disclosure for example, these dimensions may vary to be greater or larger than those described and depicted herein. These ranges of movement allow cover 14 to be repositioned with respect to the module (e.g., after the cover has been secured to the instrument panel and before the housing or other part of the module is secured to a structural member of the vehicle).

As illustrated in FIGS. 7–10 support bracket 40 has four openings. Accordingly, the housing and the door flange will have a matching amount of openings and a respective amount of studs and nuts will be used to secure the door flange to the housing. Of course, the number of openings and respective studs may be greater or less than the number illustrated herein.

Figures 9, 10, 11:
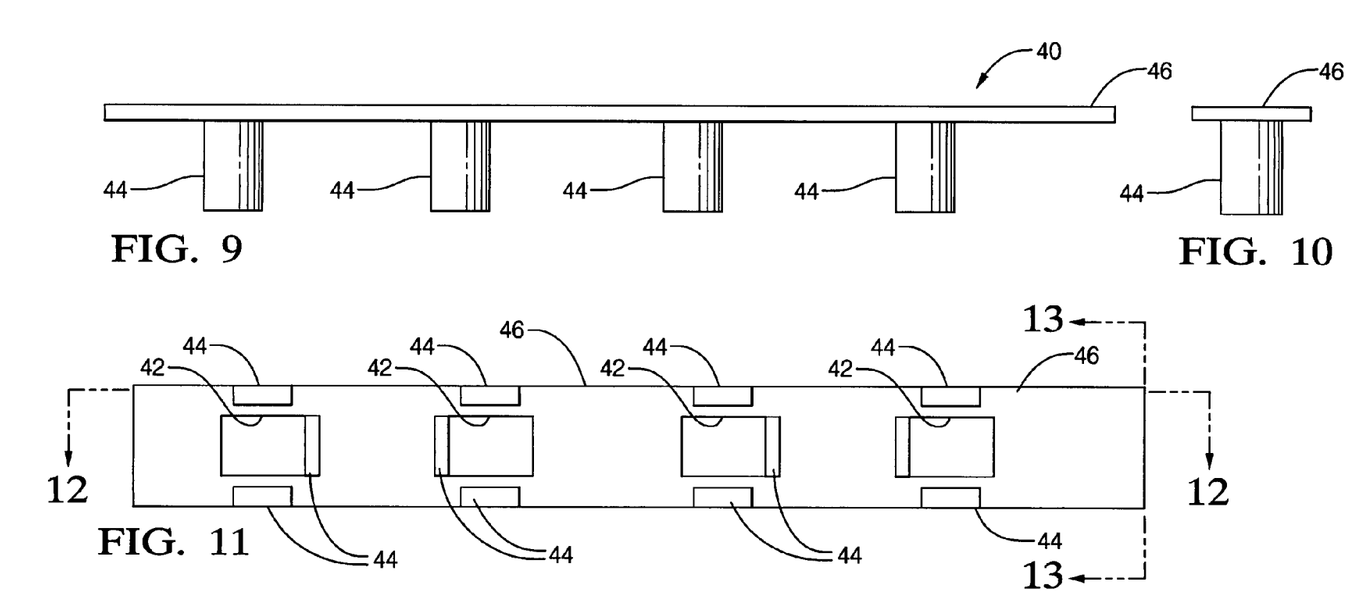
FIG. 9 is a view along lines 9—9 of FIG. 8.
FIG. 10 is a view along lines 10—10 of FIG. 8.
FIG. 11 is a side view of an alternative embodiment of the airbag module illustrated in FIG. 2.
Figure 12:
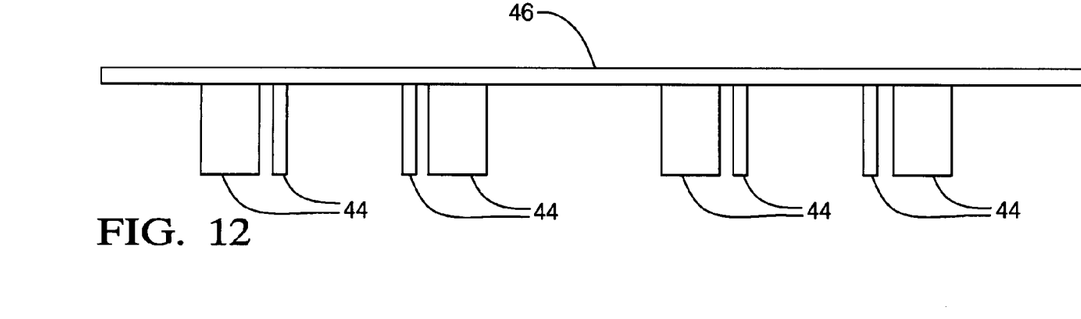
FIG. 12 is a view along lines 12—12 of FIG. 11.
Figure 13:
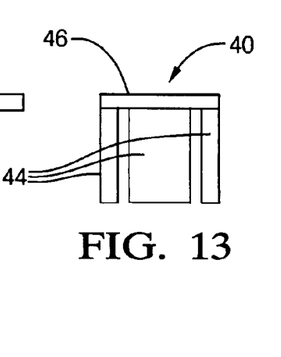
FIG. 13 is a view along lines 13—13 of FIG. 11.

Referring now to FIGS. 11–14 alternative embodiments of bracket 40 are illustrated. In FIGS. 11–13 portions 44 are defined by formed standoffs or tabs that can be formed or punched out of the material comprising bracket 40, in this embodiment, opening 42 is rectangular in shape (e.g., corresponding to the tab portion stamped therefrom) and the standoffs, portions or tabs 44 also define a rectangular or each have a rectangular shape that is to be received in opening 24 of member or flange 20. Accordingly, opening 24 should have a corresponding shape to provide the desired range of movement therein. As illustrated in FIG. 11 the positioning of the tabs 44 defines the range of movement that will be available to flange 20 of the airbag module door. Since only three tabs are illustrated for each opening, some of the tabs are positioned in an alternating fashion in order to provide the desired limits to the range of motion for flange 20.

Figure 14:
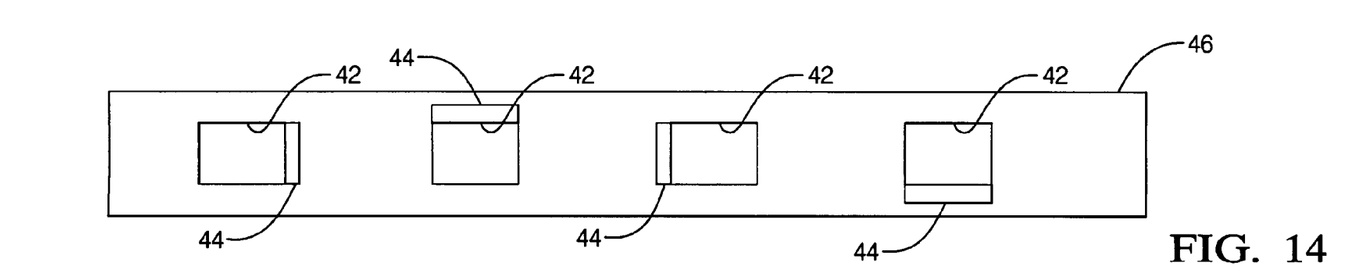
FIG. 14 is a side view of another alternative embodiment of the airbag module illustrated in FIG. 2.

FIG. 14 illustrates yet another alternative embodiment wherein opening 42 is defined by a single standoff or tab 44 stamped from bracket 40. As illustrated in FIG. 14 and in order to provide the desired range or interaction with the periphery of opening 24 it is noted that the positioning of tabs 44 in FIG. 14 embodiment are located in an alternating fashion therefore, the desired range of movement is defined by the location of the tabs portions. Bracket 40 also provides a means (e.g., usage of a nut and bolt assembly) for removing and replacing the cover without affecting other parts of the module. Thus, the cover can be replaced, if necessary without disassembly of the module.

Figure 15:
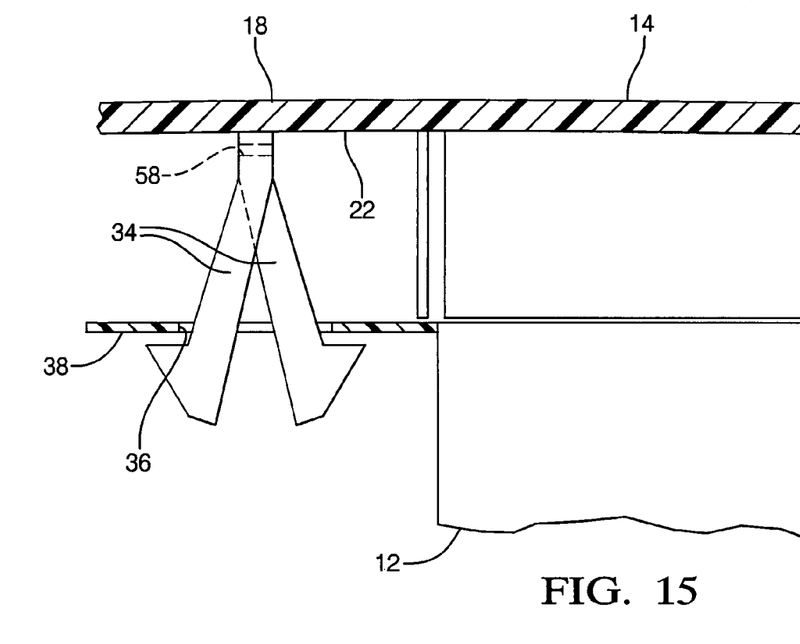
FIGS. 15–17 are views of portions of the airbag module illustrated in FIG. 2.
Figures 16, 17:
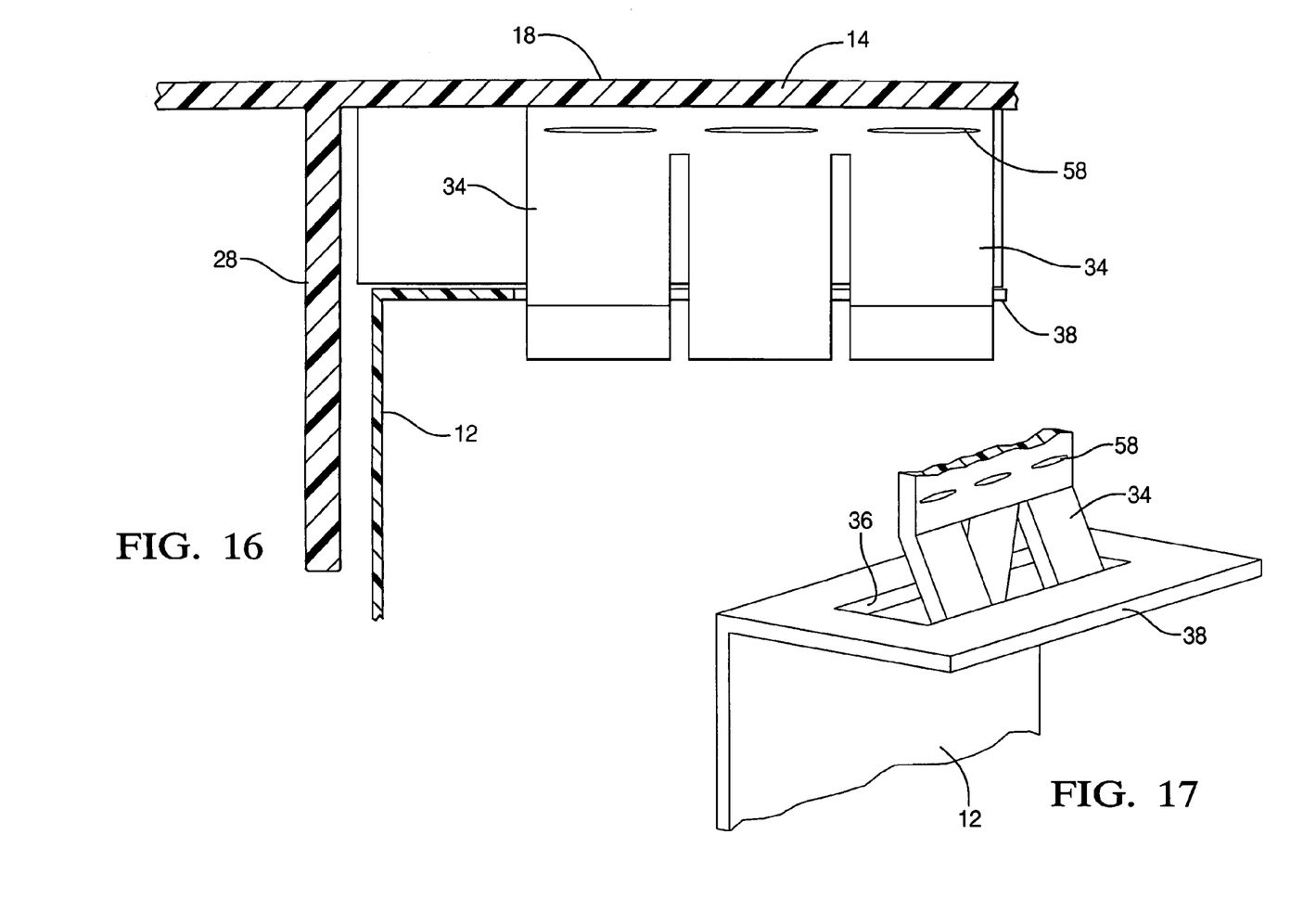

Referring now to FIGS. 15–18, the removable or deployable feature of the rearward end of the cover to module interface is illustrated. FIGS. 15–17 illustrate only portions of the housing and cover or door for purposes of clarity. As illustrated in the Figures each of the alternatively opposed hooks 34 include a tear line or weakened area 58 that when the inflatable cushion of the airbag module inflates causes the airbag module door to separate from the hook. The tear seams are located at the cover to latch hook interface or alternatively the latch hook portion. In one embodiment, the weakened area comprises a plurality of openings in the hooks at a location proximate to the cover. Alternatively, the weakened area may comprise grooves or recesses formed in the material of hooks 34, in accordance with tear seam practices known to individuals skilled in the related arts. Similarly flange or member 28 is also provided with a weakened area or tear seam to allow for the same to be separated from the cover when the inflatable cushion is deployed.

Once cover 14 is movably secured to housing 12 the module is now secured in its preferred location (e.g. within a vehicle). Referring back now to FIG. 2, cover 14 is removably secured to instrument panel 16 by inserting the module through the opening in the instrument panel wherein the cover or door 14 engages a relief portion 57 disposed about the periphery of the opening within the instrument panel. Relief portion 57 defines a shoulder 59 for receiving and supporting a portion of cover 14. In addition, and proximate to the portion of cover 14 being supported by shoulder 59 a plurality of engagement hooks 60 are integrally molded with cover 14. Engagement hooks 60 are configured to secure cover 14 in a closed or undepolyed position while allowing for the cover to deploy therefrom in the event of a deployment scenario. It is also noted that in an alternative embodiment engagement hooks 60 can also have tear seams or tear seam openings, if necessary, to facilitate the deployment of the cover by breaking the engagement hooks 60.

This movable means for securing the passenger side airbag cover or door to the housing allows the cover to float or move with respect to the housing which in turn allows for the exterior surface of the cover to be aligned or flushly mounted with respect to the exterior surface of the instrument panel surface while adjustments or movement of the housing takes place during securement of the same to the structural components of the vehicle. In an exemplary embodiment, a securement feature or features of the housing or the module is fixedly secured to a structural member of the vehicle.

Figure 18:
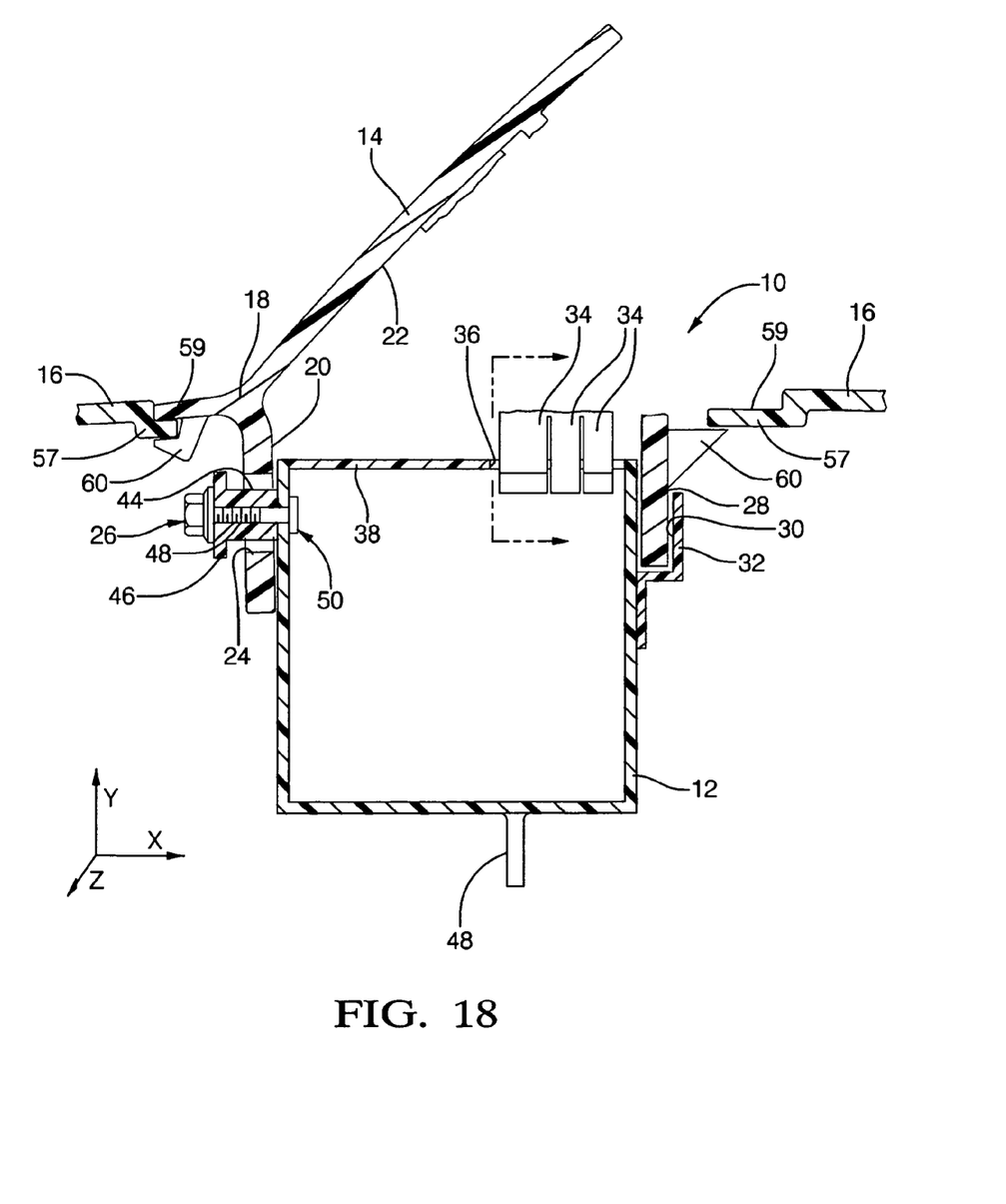
FIG. 18 is a cross sectional view illustrating deployment of the door of an airbag module constructed of the present disclosure.
Figure 19:
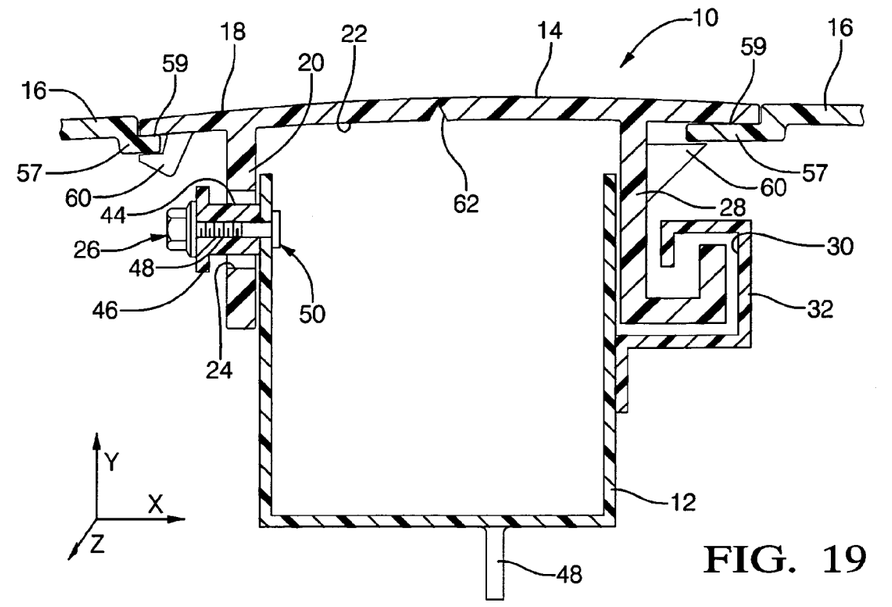
FIG. 19 is a cross sectional view of an airbag module constructed in accordance with an alternative embodiment of the present disclosure.

FIG. 18 illustrates the deployment of cover or door 14 away from the housing as well as the instrument panel wherein the door pivots toward the forward end of the module (e.g., toward the vehicle windshield) and hooks 34 and flange 28 are left behind due to the location of the tear seams.

Figure 20:
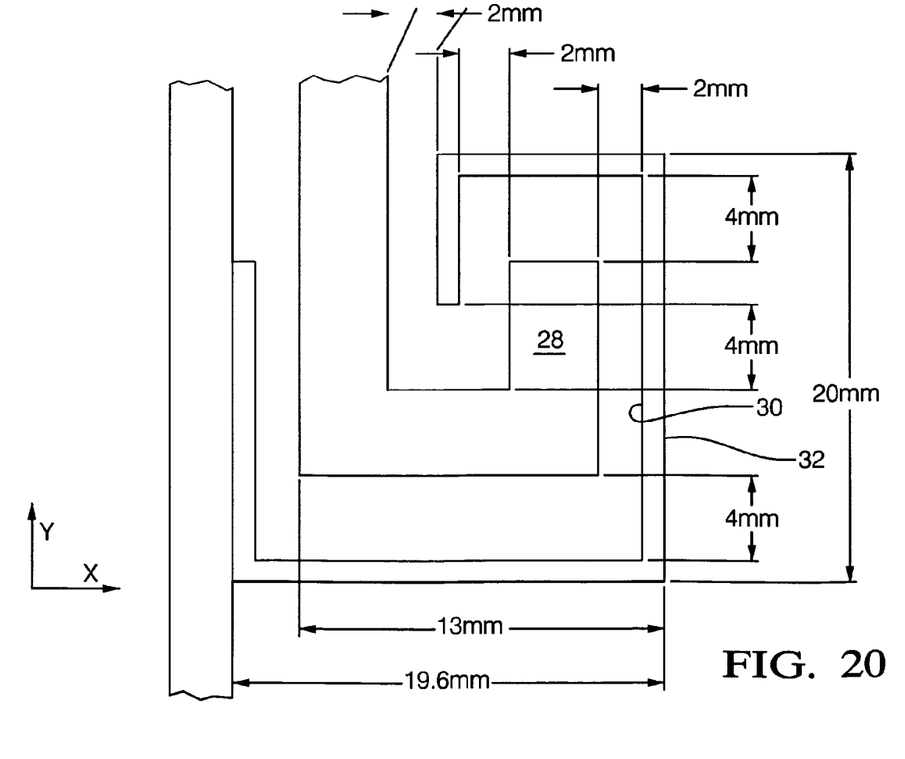
FIGS. 20 and 21 are views of portions of the airbag module illustrated in FIG. 19.
Figure 21:
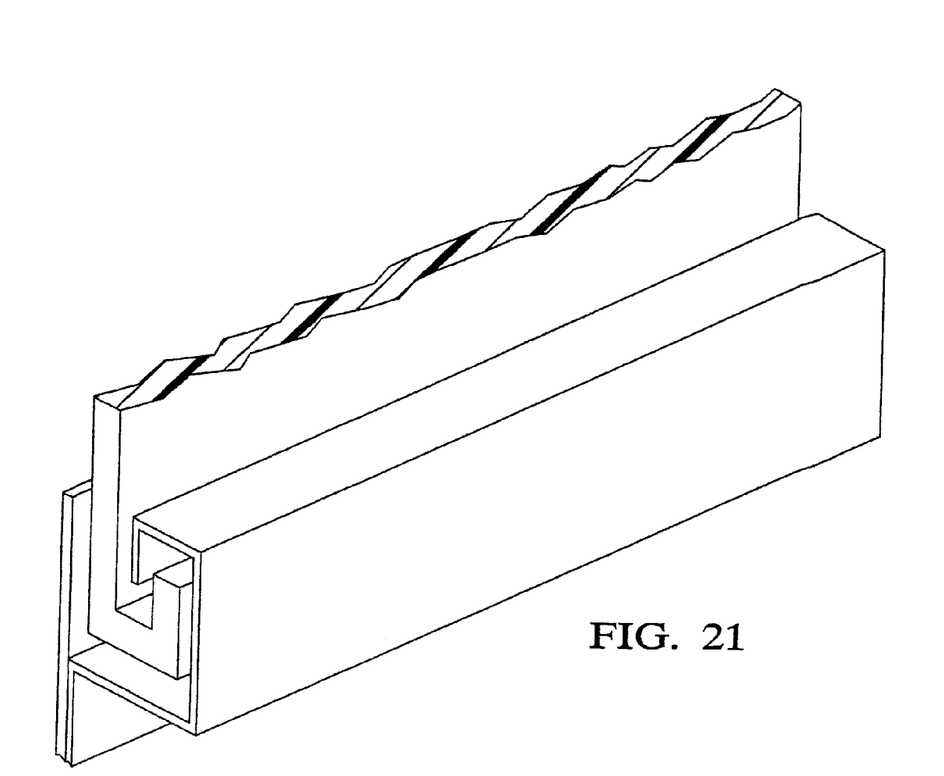

Referring now to FIGS. 19–22, an alternative embodiment of the present disclosure is illustrated. Here member or flange 28 is configured to have an elongated hook portion that is slidably received within a complimentary opening 30 defined by flange 32. Member 28 and flange 32 are configured to provide a tolerance or distance in the 'x 'and 'y 'directions as illustrated in FIG. 20 as well as allowing for member 28 to be slidably received therein. For example, and as illustrated in FIG. 20 there is 2 millimeters of play on the other side of member 28 for a total range of 4 millimeters in the 3×2 direction while there is 4 millimeters of play of either side of member 28 in the 'y 'direction for a total range of 8 millimeters. This allows for float or play between deployable cover or door 14 and module 10 in the area proximate to member 28 and flange 32 of this embodiment. Of course, these dimensions may vary and in accordance with an exemplary embodiment can be greater or larger than those depicted in FIG. 20 or comprise any combination thereof.

The molded hook or member 28 of the embodiment illustrated in FIGS. 19–22 is slid into the opening defined by the flange on the housing. As illustrated, the molded hook or member 28 runs along the width of the door and mates with a similarly shaped feature on the housing. This housing feature is also sized to allow the molded member to move in the x, y and z directions. As with the forward edge attachment the amount of movement can be varied as required.

Accordingly, and once cover 14 is secured to housing 12 cover 14 is capable of movement in each of three axis defined as 'X', 'Y' and 'Z' in FIG. 2. In one embodiment interior surface 22 of cover 14 is configured to have predetermined tear seams 62 that will allow cover 14 to open during deployment of the airbag. Contemplated tear seams include 'H', 'U' and 'I' configurations, as is known in the related arts, of course other tear seam configurations are contemplated by the present disclosure.

Figure 22:
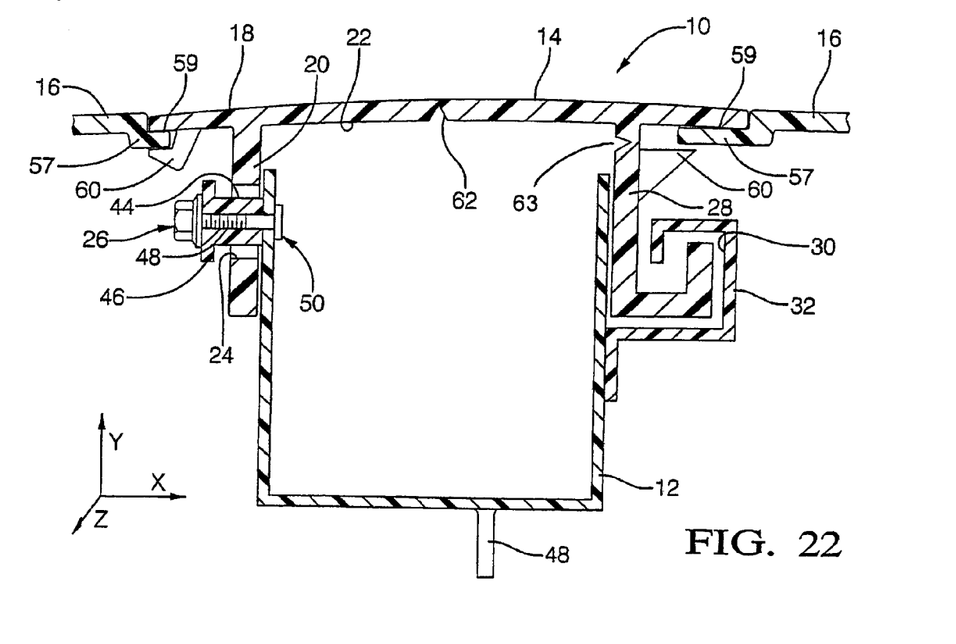
FIG. 22 is a cross sectional view of an airbag module constructed in accordance with an alternative embodiment of the present disclosure.

In yet another alternative and referring now to FIG. 22, member 28 is configured to have a tear seam 63 in order to allow the cover to deploy and pivot towards the forward edge similar to the deployment configuration shown in FIG. 18. In yet another alternative, member 28 as illustrated in FIGS. 19–22 can be configured with the latch hooks illustrated in FIGS. 2–4 and 15–18.

The apparatus and method of attachment of a passenger side airbag module door described and disclosed herein creates a "floating" door relative to the airbag housing. The floating door of the present design is configured to require a low breakout force for deployment since the opening method or tear seam are disposed away from or behind the show surface, thus, they can be configured to tear with a low breakout force for deployment. In other words, holes or openings that facilitate tear can be used without detracting from the show surface as they are concealed behind the door or in surfaces that do not comprise the exterior surface of the door.

Sizing the attachment and molded features determines the float, thus the door and module are configurable for a variety of applications.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An airbag module having an inflatable cushion for use in a vehicle having an interior surface, comprising:
   a housing;
   a deployment door having an exterior surface and an inner surface, said exterior surface comprises a portion of the interior surface of the vehicle;
   a forward door flange depending away from said inner surface, said forward door flange being movably secured to said housing and remains secured to said housing during deployment of the inflatable cushion;
   a rearward door flange depending away from said inner surface, said rearward door flange being received within a flange opening of said housing; and
   a plurality of latch hooks directly attached to and depending directly away from said inner surface, said plurality of latch hooks being configured to engage an opening in said housing.

2. The airbag module as in claim 1, wherein said rearward door flange and said plurality of latch hooks are configured to detach from said deployment door during deployment of the inflatable cushion.

3. The airbag module as in claim 1, wherein said rearward door flange and said plurality of latch hooks each have a plurality of tear seam openings, said plurality of tear seam openings enable said plurality of latch hooks and said rearward door flange to detach from said deployment door during deployment of the inflatable cushion.

4. The airbag module as in claim 1, wherein said rearward door flange further comprises a hook portion and said flange opening is configured to receive said hook portion.

5. The airbag module as in claim 1, wherein said forward door flange, said rearward door flange and said plurality of latch hooks are each configured to allow movement of said deployment door in three separate directions with respect to the airbag module and wherein said rearward door flange and said plurality of latch hooks are configured to detach from said deployment door during deployment of the inflatable cushion.

6. The airbag module as in claim 1, wherein said deployment door is formed by an injection molding process and said forward door flange, said rearward door flange and said plurality of latch hooks are integrally molded with said deployment door.

7. The airbag module as in claim 1, wherein said forward door flange is adapted to receive a securement means for hingably securing said forward door flange to said housing.

8. The airbag module as in claim 1, wherein said forward door flange comprises a plurality of openings configured to receive a securement assembly for hingably securing said forward door flange to said housing.

9. The airbag module as in claim 8, wherein said securement assembly comprises a support bracket having a plurality of holes or openings each being defined by an elongated portion which depends away from a surface of said support bracket.

10. The airbag module as in claim 9, wherein said elongated portions are drawn out of the material of said bracket.

11. The airbag module as in claim 9, wherein said plurality of openings of said forward door flange are larger than the exterior dimensions of said elongated portions thereby allowing movement of said forward door flange with respect to said housing.

12. The airbag module as in claim 11, wherein said support bracket is secured to said housing by a plurality of threaded studs and complimentary nuts, said threaded studs passing through said housing and said plurality of holes or openings in said support bracket.

13. The airbag module as in claim 8, wherein said securement assembly comprises a support bracket having a plurality of holes or openings each having one tab or standoff that depends away from the periphery of the hole.

14. The airbag module as in claim 13, wherein said plurality of openings of said forward door flange are larger than the exterior dimensions of the tab or standoff thereby allowing movement of said forward door flange with respect to said housing.

15. The airbag module as in claim 8, wherein said securement assembly comprises a support bracket having a plurality of holes or openings each having at least two tabs or standoffs that depend away from the periphery of the hole and the configuration of each adjacent hole opening and said at least two tabs or standoffs alternates.

16. The airbag module as in claim 15, wherein said plurality of openings of said forward door flange are larger than the exterior dimensions of the tabs or standoffs thereby allowing movement of said forward door flange with respect to said housing.

17. The airbag module as in claim 1, wherein said rearward door flange and said plurality of latch hooks each comprise a plurality of tear seam openings, said plurality of tear seam openings enable said plurality of latch hooks and said rearward door flange to detach from said deployment door during the deployment of the inflatable cushion;
   wherein said forward door flange, said rearward door flange and said plurality of latch hooks are each configured to allow movement of said deployment door in three separate directions with respect to the airbag module; and wherein said forward door flange comprises a plurality of openings configured to receive a securement assembly for hingably securing said forward door flange to said housing.

18. The airbag module as in claim 17, wherein said securement assembly comprises a support bracket having a plurality of holes or openings each being defined by an elongated portion which depends away from a surface of said support bracket, said plurality of openings of said forward door flange are larger than the exterior dimensions of said elongated portions thereby allowing movement of said forward door flange with respect to said housing.

19. A door for an airbag module having an inflatable cushion, the airbag module being adapted to be used in a vehicle having an instrument panel with an airbag module opening, the door having an inner surface and an outer surface adapted to match the instrument panel, comprising:
   a first member depending away from the inner surface of the door, said first member being movably secured to the airbag module and remains secured to the module during deployment of the inflatable cushion;
   a second member depending away from the inner surface of the door, said second member being received within a flange opening of the airbag module; and
   a plurality of latch hooks directly attached to and depending directly away from the inner surface of the door, said plurality of latch hooks being configured to engage an opening in the airbag module, wherein said first member, said second member and said plurality of latch hooks are each configured to allow movement of the door in three separate directions with respect to the airbag module and wherein said second member and said plurality of latch hooks are configured to detach from said door during deployment of the inflatable cushion.

20. The door as in claim 19, wherein said first member comprises a plurality of openings for receiving a securement assembly, said securement assembly movably securing said first member to the airbag module.

21. The door as in claim 19, wherein said second member further comprises a hook portion configured to be slidably received within the flange opening of the airbag module.

22. The door as in claim 19, wherein the door is formed by an injection molding process and said first member, said second member and said plurality of latch hooks are integrally molded with the door and said second member and said plurality of latch hooks are configured to detach from said door during deployment of the inflatable cushion.

23. The door as in claim 22, wherein said second member and said plurality of latch hooks each comprise a plurality of tear seam openings, said plurality of tear seam openings enable said plurality of latch hooks and said second member to detach from the door during the deployment of the inflatable cushion.

24. The door as in claim 19, further comprising a plurality of integral hooks being configured and positioned to engage a portion of the airbag module opening when the door is positioned in the airbag module opening the outer surface of the door being flush with the instrument panel.

25. The door as in claim 24, wherein the plurality of integral hooks each have a tear seam or tear seam opening.

26. A method for securing a deployable door to an airbag module, the deployable door being adapted to allow an inflatable cushion to deploy from the airbag module, comprising:
   inserting a plurality of latch hooks into an opening of the airbag module, said plurality of latch hooks directly attached to and depending directly away from an inner surface of the deployable door;
   positioning a first door flange in a flange opening of the airbag module;
   positioning a second door flange adjacent to the airbag module;
   movably securing the second door flange to the airbag module;
   wherein said first door flange, said second door flange and said plurality of latch hooks are each configured to allow movement of the deployable door in three separate directions with respect to the airbag module; and
   wherein said second door flange comprises a plurality of openings configured to receive a securement assembly for hingably securing said second door flange to the airbag module.

27. The method as in claim 26, wherein the deployable door is formed by an injection molding process and said first door flange, said second door flange and said plurality of latch hooks are integrally molded with the deployable door and first door flange and said plurality of latch hooks each have a plurality of tear seam openings, said plurality of tear seam openings enable said plurality of latch hooks and said first door flange to detach from the deployable door during the deployment of the inflatable cushion.

28. The method as in claim 27, wherein said securement assembly comprises a support bracket having a plurality of holes or openings each being defined by an elongated portion which depends away from a surface of said support bracket, said elongated portions being received in said plurality of openings of said second door flange, said plurality of openings in said second door flange are larger than the exterior dimensions of said elongated portions thereby allowing movement of said second door flange with respect to the airbag module.

29. An attachment assembly for deployably securing a door of an airbag module, the attachment assembly comprising:
   a first flange depending away from an inner surface of the door;
   a plurality of openings disposed in the first flange; and
   a mounting bracket for mounting the first flange to the airbag module, the mounting bracket comprising an elongated member having a plurality of protrusions depending away from the elongated member in a first direction and for extending through the plurality of openings in the first flange and abutting an outer surface of a housing of the airbag module, wherein the elongated member is disposed on one side of the first flange and the plurality of protrusions abut the outer surface of the housing facing another side of the first flange, wherein the plurality of openings are larger than a periphery of each of the plurality of protrusions.

30. The attachment assembly as in claim 29, wherein the plurality of protrusions each define an opening in the mounting bracket.

31. The attachment assembly as in claim 29, wherein the plurality of protrusions extend in the first direction a distance that is greater than a thickness of the first flange in the first direction.

32. The attachment assembly as in claim 29, wherein the plurality of protrusions are cylindrical in shape and the plurality of protrusions define a plurality of securement openings in the mounting bracket.

33. The attachment assembly as in claim 29, wherein the plurality of protrusions are a plurality of tabs stamped out of the material comprising the elongated member, and wherein a plurality of securement openings are defined by the plurality of tabs.

34. The attachment assembly as in claim 33, wherein the plurality of tabs and the plurality of securement openings are rectangular in shape and the plurality of openings in the first flange are also rectangular in shape, and wherein the plurality of openings in the first flange are larger than the plurality of securement openings in the elongated member.

35. An attachment assembly for deployably securing a door of an airbag module, the attachment assembly comprising:
a first flange depending away from an inner surface of the door;
a plurality of openings disposed in the first flange; and
a mounting bracket for mounting the first flange to the airbag module, the mounting bracket comprising an elongated member having a plurality of protrusions depending away from the elongated member in a first direction and for extending through the plurality of openings in the first flange and abutting an outer surface of a housing of the airbag module, wherein the plurality of openings are larger than a periphery of each of the plurality of protrusions; and
a second flange depending away from the inner surface of the door, the second flange being configured to engage a complimentary portion of the airbag module, the second flange being configured to detach from the door upon application of a force to the inner surface of the door, wherein the door is capable of movement in three different directions with respect to the airbag module when the door is secured to the airbag module by the first flange and the second flange.

36. An attachment assembly for deployably securing a door of an airbag module, the attachment assembly comprising:
a first flange depending away from an inner surface of the door;
a plurality of openings disposed in the first flange;
a mounting bracket for mounting the first flange to the airbag module, wherein the mounting bracket is manufactured out of steel, the mounting bracket comprising an elongated member having a plurality of protrusions depending away from the elongated member in a first direction and for extending through the plurality of openings in the first flange, the plurality of protrusions each defining a securement opening, wherein the plurality of openings are larger than a periphery of each of the plurality of protrusions;
a plurality of mounting bolts depending away from a housing of the airbag module; and
a plurality of securement nuts configured for engaging the plurality of mounting bolts after they pass through the securement openings and the plurality of openings in the first flange, wherein each of the plurality of securement nuts has an outer dimension greater than a dimension of the securement openings.

37. The attachment assembly as in claim 36, wherein the plurality of mounting bolts are integrally formed with the housing.

38. The attachment assembly as in claim 36, wherein the plurality of mounting bolts are inserted into complimentary openings in the housing.

39. An attachment assembly for deployably securing a door of an airbag module, the attachment assembly comprising:
a first flange depending away from an inner surface of the door;
a plurality of openings disposed in the first flange; and
a mounting bracket for mounting the first flange to the airbag module, the mounting bracket comprising an elongated member having a plurality of protrusions depending away from the elongated member in a first direction and for extending through the plurality of openings in the first flange and abutting an outer surface of a housing of the airbag module, wherein the plurality of openings are larger than a periphery of each of the plurality of protrusions and the plurality of protrusions make contact with a housing of the airbag module when the mounting bracket is secured to the housing, wherein the elongated member is disposed in a facing spaced relationship with respect to the housing and the first flange is secured to the housing by the plurality of protrusions.

40. An attachment assembly for deployably securing a door of an airbag module, the attachment assembly comprising:
a first flange depending away from an inner surface of the door;
a plurality of openings disposed in the first flange; and
a mounting bracket for mounting the first flange to the airbag module, the mounting bracket comprising an elongated member having a plurality of protrusions depending away from the elongated member in a first direction and for extending through the plurality of openings in the first flange, wherein the plurality of openings are larger than a periphery of each of the plurality of protrusions, wherein the plurality of protrusions are a plurality of tabs stamped out of the material comprising the elongated member, and wherein a plurality of securement openings are defined by the plurality of tabs, wherein the plurality of tabs and the plurality of securement openings are rectangular in shape and the plurality of openings in the first flange are also rectangular in shape, and wherein the plurality of openings in the first flange are larger than the plurality of securement openings in the elongated member, wherein the plurality of tabs are located in an alternative fashion wherein one of the plurality of tabs is substantially perpendicular an adjacent tab of the plurality of tabs.

41. An attachment assembly for deployably securing a door of an airbag module, the attachment assembly comprising:
a first flange depending away from an inner surface of the door;
a plurality of openings disposed in the first flange; and
a mounting bracket for mounting the first flange to the airbag module, the mounting bracket comprising an elongated member having a plurality of protrusions depending away from the elongated member in a first direction and for extending through the plurality of openings in the first flange, wherein the plurality of openings are larger than a periphery of each of the plurality of protrusions, wherein the plurality of protrusions are a plurality of tabs stamped out of the material comprising the elongated member, and wherein a plurality of securement openings are defined by the plurality of tabs, wherein the number of the plurality of tabs is greater than the number of the plurality of securement openings defined by the plurality of tabs.

42. An attachment assembly for securing a mounting portion of a door of an airbag module to a housing of the airbag module, the attachment assembly comprising:

an elongated member having a plurality of protrusions depending away from the elongated member in a first direction, the protrusions abutting an outer surface of the housing of the airbag module, wherein each of the plurality of the protrusions has a periphery smaller than a complimentary one of a plurality of openings in the mounting portion of the door, wherein the attachment assembly allows the mounting portion to move in at least three different directions with respect to the housing when the mounting portion is secured to the housing by the elongated member, wherein the plurality of protrusions are cylindrical in shape and the plurality of protrusions define a plurality of securement openings in the elongated member and wherein the plurality of protrusions make contact with the housing when the elongated member is secured to the housing, wherein the elongated member is disposed in a facing spaced relationship with respect to the housing and the mounting portion is secured to the housing by the plurality of protrusions.

43. The attachment assembly as in claim 42, wherein the plurality of protrusions each extend in the first direction a distance that is greater than a thickness of the mounting portion in the first direction.

44. An attachment assembly for securing a mounting portion of a door of an airbag module to a housing of the airbag module, the attachment assembly comprising:

an elongated member having a plurality of protrusions depending away from the elongated member in a first direction, wherein each of the plurality of the protrusions has a periphery smaller than a complimentary one of a plurality of openings in the mounting portion of the door, wherein the attachment assembly allows the mounting portion to move in at least three different directions with respect to the housing when the mounting portion is secured to the housing by the elongated member, wherein the plurality of protrusions each define a securement opening in the elongated member and the plurality of protrusions extend in the first direction a distance that is greater than a thickness of the mounting portion in the first direction; and a plurality of mounting bolts depending away from the housing and a plurality of securement nuts configured for engaging the plurality of mounting bolts after they pass through the securement openings in the elongated member and the plurality of openings in the mounting portion, wherein each of the plurality of securement nuts has an outer dimension greater than a dimension of the securement openings.

* * * * *